(12) United States Patent
Lin

(10) Patent No.: US 6,493,216 B1
(45) Date of Patent: Dec. 10, 2002

(54) PORTABLE COMPUTER WITH AN LCD WHICH CAN BE ROTATED WITHIN 360 DEGREES

(75) Inventor: Wen-Cheng Lin, Ping-Chen (TW)

(73) Assignee: Arima Computer Corp., Taipei (TW)

( * ) Notice: Subject to any disclaimer, the term of this patent is extended or adjusted under 35 U.S.C. 154(b) by 0 days.

(21) Appl. No.: 09/457,076

(22) Filed: Dec. 9, 1999

(30) Foreign Application Priority Data

Oct. 20, 1999 (TW) ........................................ 88118148 A

(51) Int. Cl.$^7$ ................................................. G06F 1/16
(52) U.S. Cl. ........................ 361/681; 361/679; 361/683; 364/708.1; 312/223.1; 345/905
(58) Field of Search ................................. 361/680, 681, 361/683, 679, 687; 364/705.01, 708.01; 312/223.1, 223.2; 345/905; 248/917; 16/342, 366, 378, 379, 354, 321, 341

(56) References Cited

U.S. PATENT DOCUMENTS

| | | | | |
|---|---|---|---|---|
| 5,333,356 A | * | 8/1994 | Katagiri | 16/340 |
| 5,481,430 A | * | 1/1996 | Miyagawa et al. | 361/681 |
| 5,661,632 A | * | 8/1997 | Register | 361/683 |
| 5,719,799 A | * | 2/1998 | Isashi | 364/705.01 |
| 5,987,704 A | * | 11/1999 | Tang | 16/354 |
| 6,101,676 A | * | 8/2000 | Wahl et al. | 16/342 |
| 6,154,359 A | * | 11/2000 | Kamikakai et al. | 361/681 |

FOREIGN PATENT DOCUMENTS

| | | | | | |
|---|---|---|---|---|---|
| JP | 408179851 A | * | 7/1996 | | G06F/1/16 |
| JP | 408179854 A | * | 7/1996 | | G06F/1/16 |
| JP | 410116134 A | * | 5/1998 | | G06F/1/16 |
| JP | 411024788 A | * | 1/1999 | | G06F/1/16 |
| JP | 411219232 A | * | 8/1999 | | G06F/1/18 |
| JP | 411296258 A | * | 10/1999 | | G06F/1/16 |
| TW | 080201299 | | 1/1991 | | |
| TW | 083201145 | | 1/1994 | | |
| TW | 086221155 | | 12/1997 | | |

* cited by examiner

Primary Examiner—Lynn D. Feild
Assistant Examiner—Michael Datskovsky
(74) Attorney, Agent, or Firm—Winston Hsu

(57) ABSTRACT

A portable computer comprises a machine body approximately rectangular in shape comprising a front end, a rear end, a top face and a bottom face; a liquid crystal display approximately rectangular in shape comprising an upper end and a lower end; and a connecting device comprising a front end and a rear end. The front end of the connecting device is fixed to the rear end of the machine body in a rotatable manner, and the rear end of the connecting device is fixed to the lower end of the liquid crystal display. The connecting device enables the liquid crystal display to be folded upon the top face of the machine body by a forward rotation or upon the bottom face of the machine body by a backward rotation.

11 Claims, 6 Drawing Sheets

PORTABLE COMPUTER WITH AN LCD WHICH CAN BE ROTATED WITHIN 360 DEGREES

BACKGROUND OF THE INVENTION

1. Field of the Invention

The present invention relates to a portable computer, and more particularly, to a portable computer with an LCD that can be rotated within 360 degrees.

2. Description of the Prior Art

A general portable computer comprises a machine body and an LCD connected to one end of the machine body in a rotatable manner. A keyboard is installed on the machine body as an input device and the LCD displays the images generated as a result of the various input signals.

Please refer to FIG. 1 and FIG. 2. FIG. 1 and FIG. 2 are diagrams of a portable computer 10 according to the prior art. The portable computer 10 comprises a machine body 12 that is approximately rectangular in shape, and an LCD 14 that is also approximately rectangular in shape connected to an end 16 of the machine body 12. The LCD 14 can be folded onto the top face of the machine body 12 by a forward rotation (FIG. 1), or it can be folded backwards 180 degrees to form a flat surface that is parallel to the machine body 12 (FIG. 2).

Please refer to FIG. 3 to FIG. 5. FIG. 3 to FIG. 5 are diagrams of an alternative portable computer 20 according to the prior art. The portable computer 20 comprises an approximately rectangular machine body 22, an LCD 24 that is also approximately rectangular in shape, and a connecting device 26 to connect together the machine body 22 and the LCD 24. The connecting device 26 will permit the LCD 24 to be folded upon the top face of the machine body 22 by a forward rotation (FIG. 3). The LCD 24 can also form a flat surface parallel to the machine body 22 by a 180 degree backward rotation (FIG. 4). In addition, the connecting device 26 permits the LCD 24 to make an acute angle θ with the bottom face 28 of the machine body 22 by a further backward rotation. However, neither of the prior art portable computers permits the LCD to be folded upon the bottom face of the machine body.

SUMMARY OF THE INVENTION

It is therefore a primary objective of the present invention to provide a portable computer with an LCD which can be rotated within 360 degrees to solve the above mentioned problem.

In a preferred embodiment, the present invention provides a portable computer comprising:
- a machine body approximately rectangular in shape comprising a front end, a rear end, a top face and a bottom face;
- a liquid crystal display approximately rectangular in shape comprising an upper end and a lower end; and
- a connecting device comprising a front end and a rear end, the front end of the connecting device fixed to the rear end of the machine body in a rotatable manner, the rear end of the connecting device fixed to the lower end of the liquid crystal display;
- wherein the connecting device enables the liquid crystal display to be folded upon the top face of the machine body by a forward rotation or upon the bottom face of the machine body by a backward rotation.

It is an advantage of the present invention that, with the connecting device, the liquid crystal display can not only be folded upon the top face of the machine body, but can also be folded upon the bottom face of the machine body.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
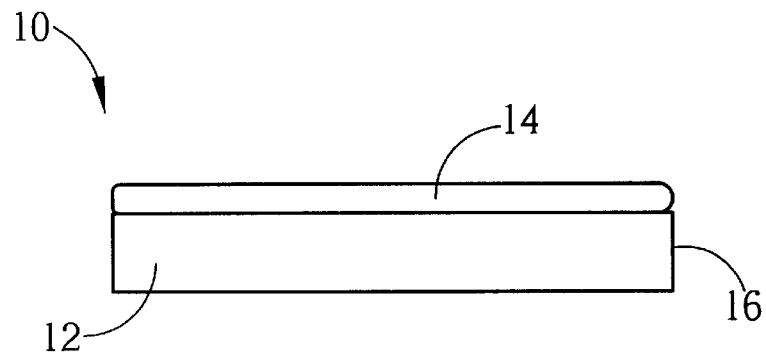
FIG. 1 and FIG. 2 are diagrams of a portable computer according to the prior art.
Figure 2:
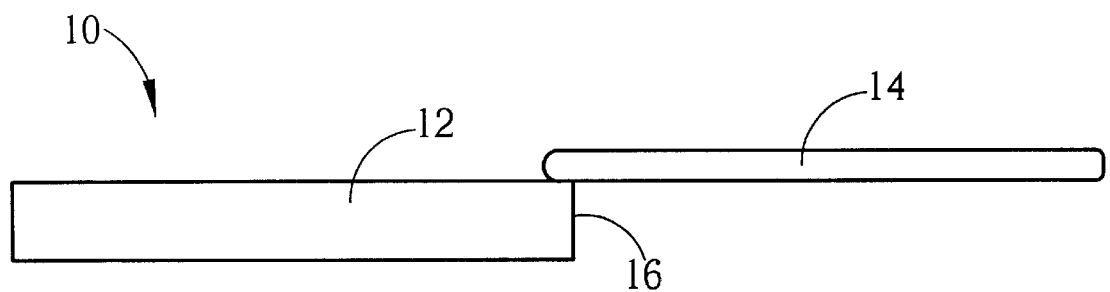
Figure 3:
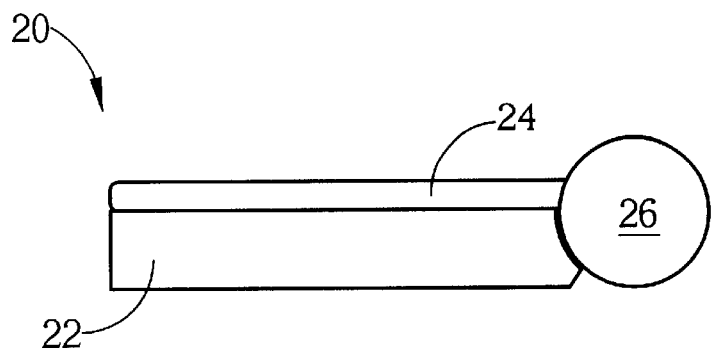
FIG. 3 to FIG. 5 are diagrams of an alternative portable computer according to the prior art.
Figure 4:
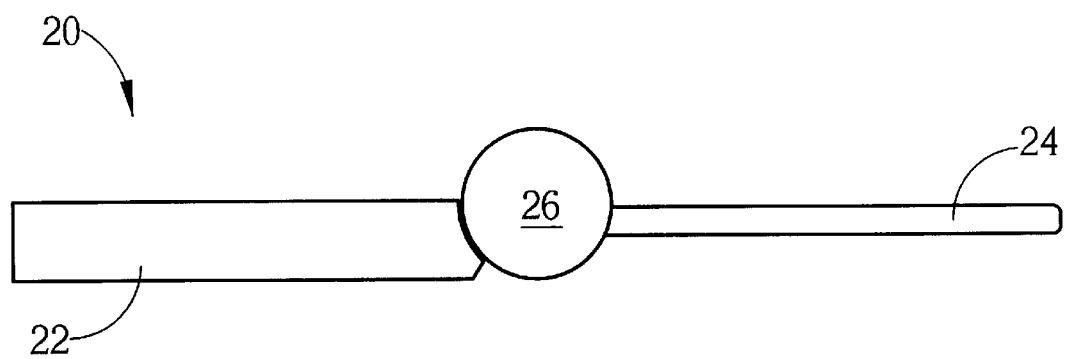
Figure 5:
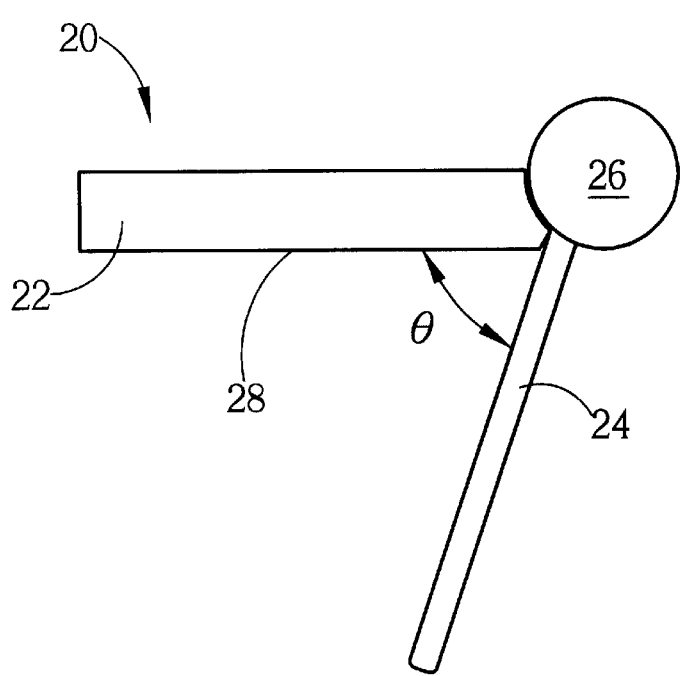
Figure 6:
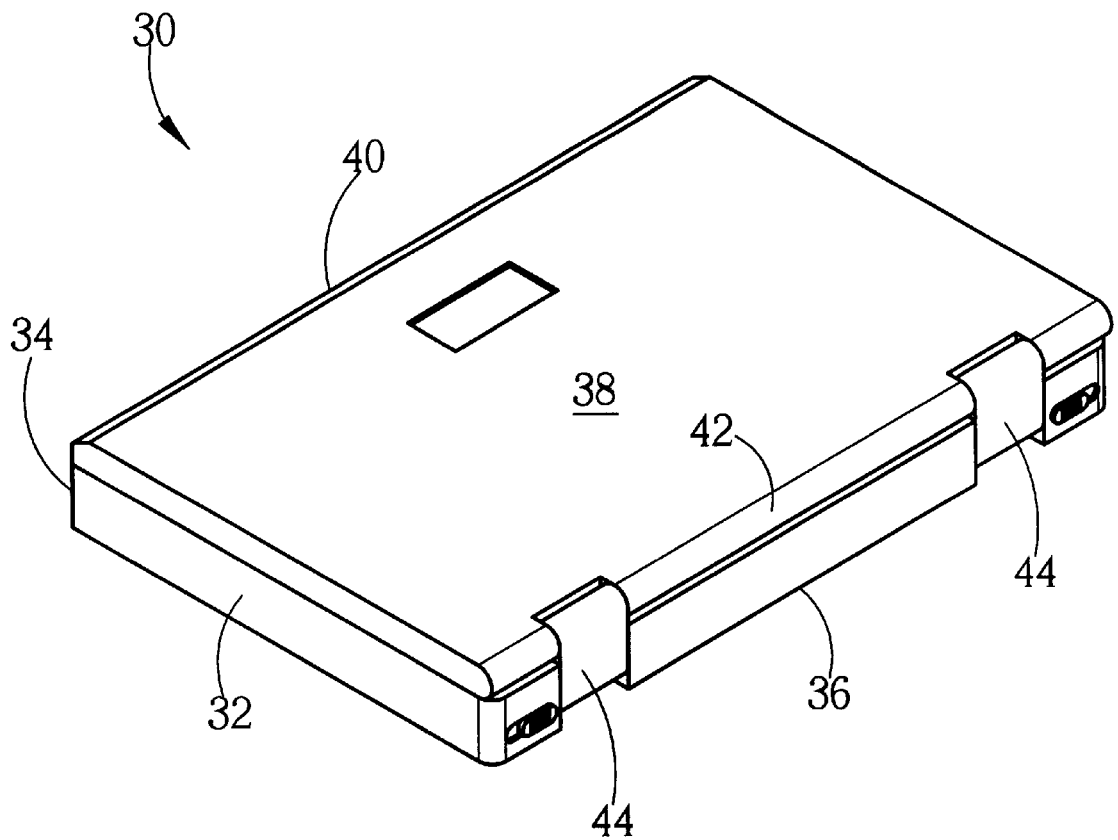
FIG. 6 is a perspective view of a portable computer according to the present invention.

Please refer to FIG. 6. FIG. 6 is a perspective view of a portable computer 30 according to the present invention. The portable computer 30 comprises a machine body 32 that is approximately rectangular in shape, a liquid crystal display (LCD) 38 and two connecting modules 44. The machine body 32 comprises a front end 34, a rear end 36, a top face, and a bottom face. The LCD 38 is approximately rectangular in shape and comprises an upper end 40 and a lower end 42. The two connecting modules 44 are separately installed on the left and right sides of the rear end 36 of the machine body 32, and are used to connect the rear end 36 of the machine body 32 with the lower end 42 of the liquid crystal display 38. The connecting modules 44 enable the liquid crystal display 38 to be folded upon the top face of the machine body 32 by a forward rotation or upon the bottom face of the machine body 32 by a backward rotation.

Figure 7:
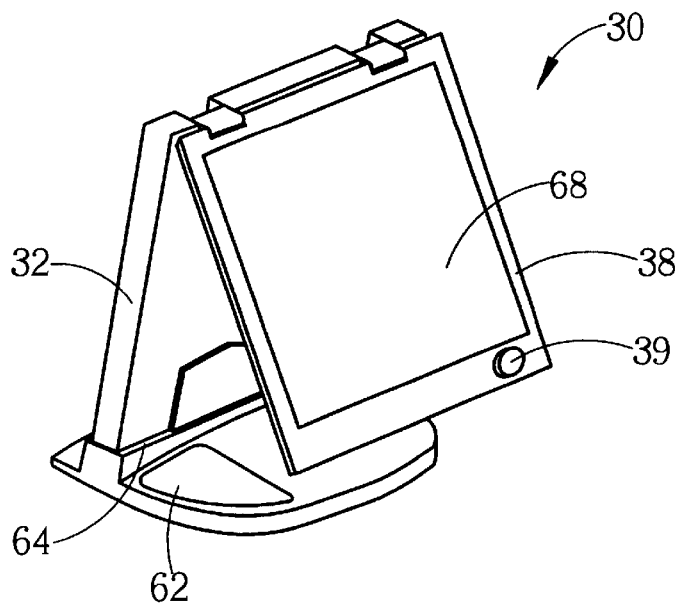
FIG. 7 and FIG. 8 are perspective views of the portable computer shown in FIG. 6 installed on a base.
Figure 8:
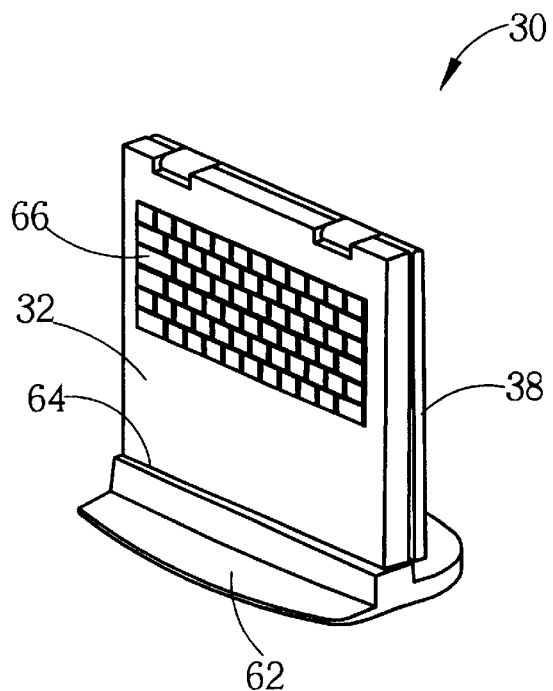

Please refer to FIG. 7 and FIG. 8. FIG. 7 and FIG. 8 are perspective views of the portable computer 30 shown in FIG. 6 installed on a base 62. The portable computer 30 further comprises a base 62 with a recession 64 installed on its top. When the liquid crystal display 38 is folded towards the bottom face of the machine body 32 by a backwards rotation, the front end 34 of the machine body 32 can be vertically inserted into the recession 64 of the base 62 so that the liquid crystal display 38 can be vertically hung from the machine body 32. A computer circuit (not shown) is installed inside the machine body 32, and a keyboard 66 is installed on the top face of the machine body 32 and electrically connected to the computer circuit. A forward-facing LCD panel 68 is installed in the liquid crystal display 38, and the LCD panel 68 is electrically connected with the computer circuit in the machine body 32 to display images transmitted from the computer circuit. The liquid crystal display 38 further comprises a button 39 connected with the computer circuit that is used to control the orientation of the images displayed by the LCD panel 68. When the button 39 is pressed the computer circuit will reverse the orientation of the images displayed by the LCD panel 68.

Figure 9:
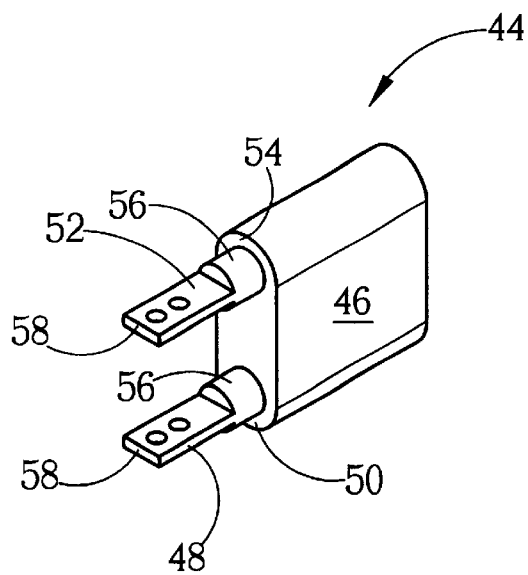
FIG. 9 is a perspective view of the connecting module shown in FIG. 6.

Please refer to FIG. 9. FIG. 9 is a schematic diagram of the connecting module 44 shown in FIG. 6. Each connecting module 44 comprises a connecting piece 46, a first shaft 48 and a second shaft 52. The first shaft 48 is fixed to the front end 50 of the connecting piece 46 in a rotatable manner, and is used to connect to the rear end 36 of the machine body 32.

The second shaft 52 is fixed to the rear end 54 of the connecting piece 46 in a rotatable manner, and is used to connect to the lower end 42 of the liquid crystal display 38. Both the first shaft 48 and the second shaft 52 comprise two ends, 56 and 58. One end 56 of the first shaft 48 is connected to the front end 50 of the connecting piece 46. One end 56 of the second shaft 52 is connected to the rear end 54 of the connecting piece 46. The other end 58 of the first shaft 48 is connected to the rear end 36 of the machine body 32. The other end 58 of the second shaft 52 is connected to the lower end 42 of the liquid crystal display 38. The first shaft 48 is a non-friction-loaded torque shaft. The second shaft 52 is a friction-loaded torque shaft so that the liquid crystal display 38 can be fixed at any angle.

Figure 10:
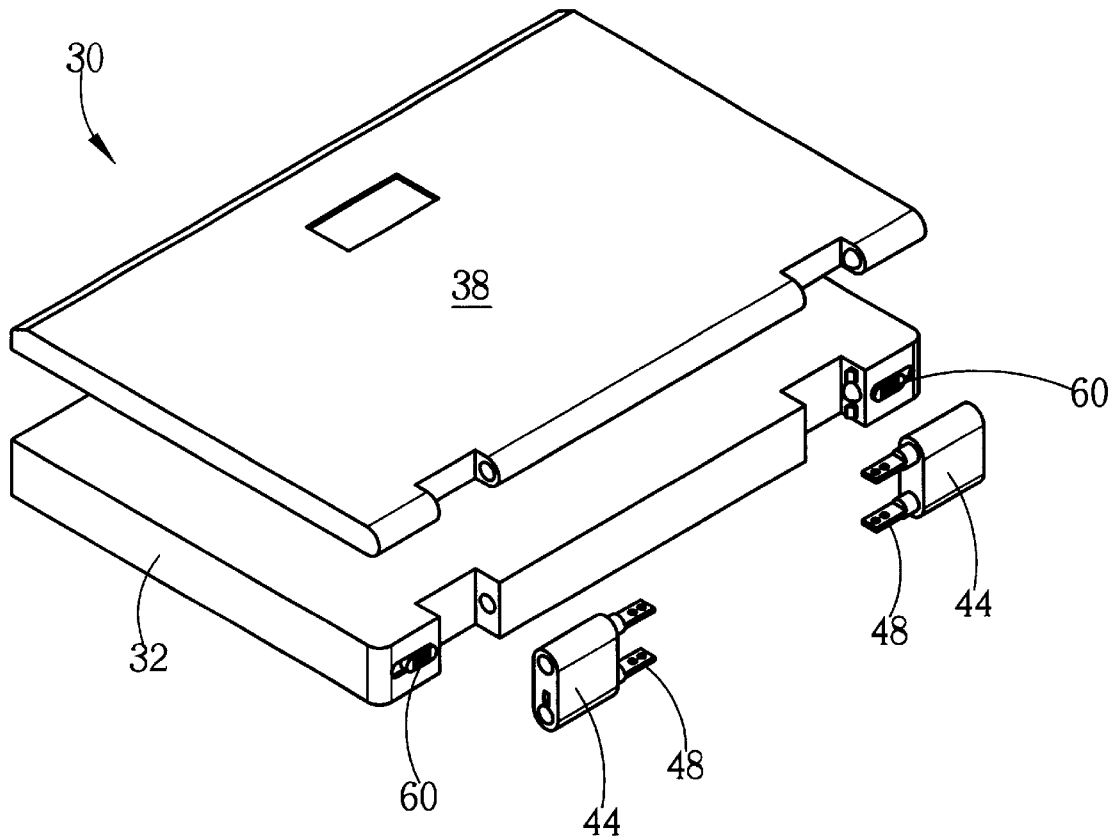
FIG. 10 is an exploded diagram of the portable computer shown in FIG. 6.

Please refer to FIG. 10. FIG. 10 is an exploded diagram of the portable computer 30 shown in FIG. 6. The portable computer 30 further comprises a latching device 60 used for fixing the connecting piece 46 of the connecting module 44 to the rear end 36 of the machine body 32 so that the first shaft 48 of the connecting module 44 cannot be rotated, and hence the liquid crystal display 38 can only utilize the second shaft 52 of the connecting module 44 to rotate forwards and backwards. The latching device 60 can be a spring-loaded latching device or a screw-tight device.

Figure 11:
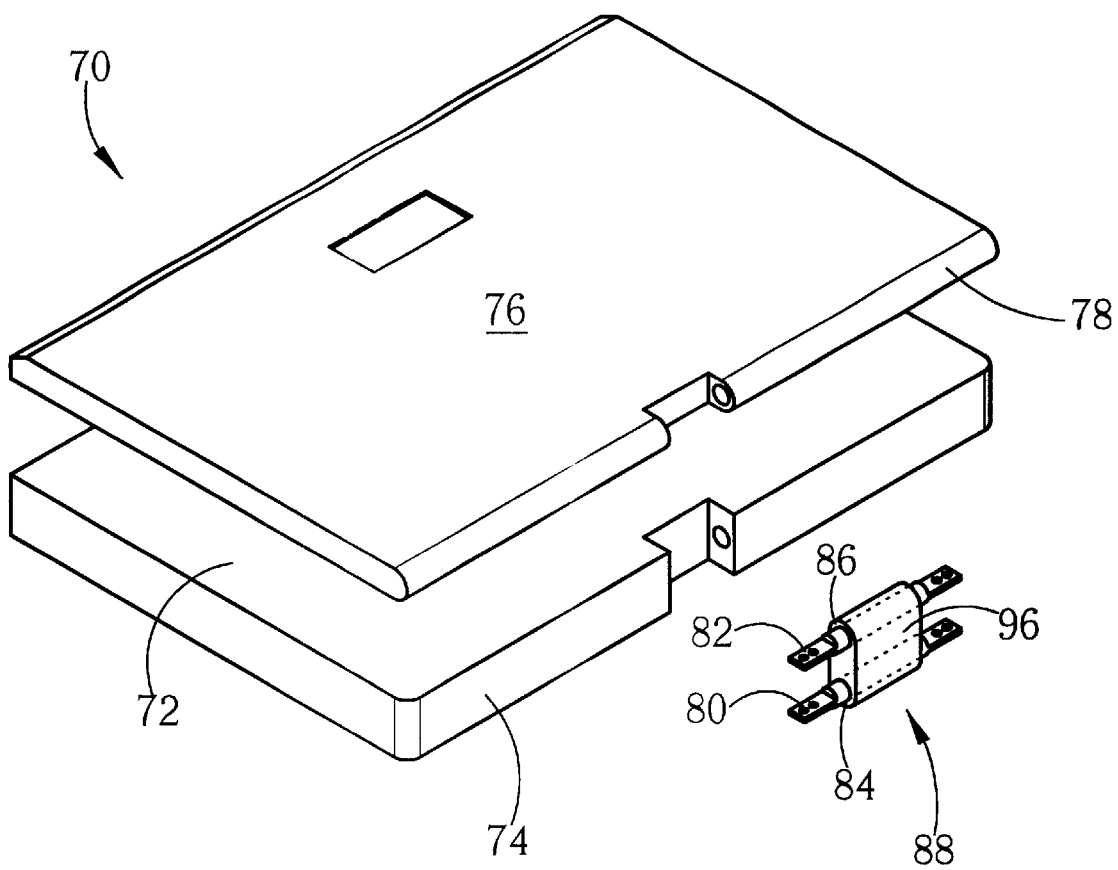
FIG. 11 is an exploded diagram of an alternative portable computer according to the present invention.

Please refer to FIG. 11. FIG. 11 is an exploded diagram of an alternative portable computer 70 according to the present invention. Compared to the portable computer 30, the portable computer 70 only has one connecting module 88 installed at the center portion of the rear end 74 of the machine body 72 used for connecting the rear end 74 of the machine body 72 and the lower end 78 of the liquid crystal display 76. The center portions of the first and second shafts 80, 82 of the connecting module 88 are separately fixed to the front end 84 and the rear end 86 of the connecting piece 96. And the two ends of the first and second shafts 80, 82 are separately fixed to the rear end 74 of the machine body 72 and the lower end 78 of the liquid crystal display 76.

Compared to the prior art portable computers 10 and 20, by using the connecting modules 44, 88 of the present invention portable computer 30, 70 the liquid crystal display 38, 76 can not only be folded upon the top face of the machine body 32, 72 but can also be folded upon the bottom face of the machine body 32, 72. This solves the inability of the prior art LCD 14, 24 to fold onto the bottom face of the machine body 12, 22.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A portable computer comprising:
   a machine body approximately rectangular in shape comprising a front end, a rear end, a top face and a bottom face;
   a liquid crystal display approximately rectangular in shape comprising an upper end and a lower end;
   a connecting device comprising a front end and a rear end, the front end of the connecting device fixed to the rear end of the machine body in a rotatable manner, the rear end of the connecting device fixed to the lower end of the liquid crystal display; wherein the connecting device enables the liquid crystal display to be folded upon the top face of the machine body by a forward rotation or upon the bottom face of the machine body by a backward rotation; and
   a base with a recession installed on a top of the base wherein when the liquid crystal display is folded towards the bottom face of the machine body by a backwards rotation, the front end of the machine body is capable of being vertically inserted into the recession of the base so that the liquid crystal display is capable of being hung from the machine body vertically.

2. The portable computer of claim 1 wherein a computer circuit is installed inside the machine body, and a keyboard is installed on the top face of the machine body and electrically connected to the computer circuit.

3. The portable computer of claim 2 wherein a forward-facing LCD panel is installed in the liquid crystal display, and the LCD panel is electrically connected with the computer circuit in the machine body to display images transmitted from the computer circuit.

4. The portable computer of claim 3 wherein the liquid crystal display further comprises a button connected with the computer circuit used for controlling the orientation of the images displayed by the LCD panel.

5. The portable computer of claim 4 wherein when the button is pressed the computer circuit will reverse the orientation of the images displayed by the LCD panel.

6. The portable computer of claim 1 wherein the connecting device comprises at least one connecting module, and the connecting module comprises:
   a connecting piece;
   a first shaft fixed to the front end of the connecting piece in a rotatable manner used for connecting to the rear end of the machine body; and
   a second shaft fixed to the rear end of the connecting piece in a rotatable manner used for connecting to the lower end of the liquid crystal display.

7. The portable computer of claim 6 wherein the connecting device comprises two connecting modules separately installed at the left and right side of the rear end of the machine body used for connecting the rear end of the machine body with the lower end of the liquid crystal display.

8. The portable computer of claim 7 wherein each of the first shaft and the second shaft comprises two ends, one end of the first shaft and one end of the second shaft are separately fixed to the front end and rear end of the connecting piece, and the other end of the first shaft and the other end of the second shaft are separately fixed to the rear end of the machine body and the lower end of the liquid crystal display.

9. The portable computer of claim 6 wherein the connecting device comprises a connecting module installed in the center portion of the rear end of the machine body used for connecting the rear end of the machine body with the lower end of the liquid crystal display.

10. The portable computer of claim 9 wherein the center portions of the first shaft and the second shaft are separately fixed to the front end and rear end of the connecting piece, and the two ends of the first shaft and the two ends of the second shaft are separately fixed to the rear end of the machine body and the lower end of the liquid crystal display.

11. The portable computer of claim 6 further comprising a latching device used for fixing the connecting piece of the connecting module to the rear end of the machine body so that the first shaft of the connecting module can not be rotated and the liquid crystal display can only utilize the second shaft of the connecting module to rotate forward and backward.

* * * * *